(12) United States Patent
Bheemasena Rao Narasimha Murthy et al.

(10) Patent No.: US 11,443,330 B2
(45) Date of Patent: Sep. 13, 2022

(54) PRODUCT PREFERENCE AND TREND ANALYSIS FOR GATHERINGS OF INDIVIDUALS AT AN EVENT

(71) Applicant: International Business Machines Corporation, Armonk, NY (US)

(72) Inventors: Jayasimha Bheemasena Rao Narasimha Murthy, North Brunswick, NJ (US); Pietro Mazzoleni, New York City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/996,066

(22) Filed: Aug. 18, 2020

(65) Prior Publication Data

US 2020/0380539 A1 Dec. 3, 2020

Related U.S. Application Data

(63) Continuation of application No. 14/933,196, filed on Nov. 5, 2015, now Pat. No. 10,762,515.

(51) Int. Cl.
 *G06Q 10/00* (2012.01)
 *G06Q 30/02* (2012.01)
(52) U.S. Cl.
 CPC .............................. *G06Q 30/0201* (2013.01)
(58) Field of Classification Search
 None
 See application file for complete search history.

(56) References Cited

U.S. PATENT DOCUMENTS

| | | | | |
|---|---|---|---|---|
| 5,974,396 A * | 10/1999 | Anderson | ............... | G06Q 30/02 705/14.25 |
| 6,044,353 A * | 3/2000 | Pugliese, III | .......... | G06Q 10/02 235/375 |
| 8,089,340 B2 * | 1/2012 | Cochran | ................ | G07C 9/257 340/5.7 |
| 9,111,402 B1 * | 8/2015 | Krishnan | ................. | G07C 9/37 |
| 2002/0168084 A1 * | 11/2002 | Trajkovic | ........... | G06K 9/00778 382/100 |
| 2003/0173403 A1 * | 9/2003 | Vogler | ..................... | G07C 9/28 235/385 |

(Continued)

OTHER PUBLICATIONS

Yang Xiao, Senhua Yu, Kui Wu, Qiang Ni, Christopher Janecek, and Julia Nordstad (Radio frequency identification: technologies, applications, and research issues, Wireless Communications and Mobile Computing Wirel. Commun. Mob. Comput. 2007; 7:457-472). (Year: 2007).*

(Continued)

*Primary Examiner* — Hafiz A Kassim
(74) *Attorney, Agent, or Firm* — Scully, Scott, Murphy & Presser, P.C.; Joseph Petrokaitis

(57) ABSTRACT

A system, method and program product for analyzing product preferences and providing trend analysis for a gathering of individuals at an event. An infrastructure is disclosed having a system for setting up and managing an event; a system for registering users physically attending the event; a system for registering items associated with the users and storing event-user-item (EUI) information in an EUI database; and an analysis system for analyzing EUI information to provide item preferences and trend analysis.

10 Claims, 3 Drawing Sheets

(56) References Cited

U.S. PATENT DOCUMENTS

| | | | |
|---|---|---|---|
| 2003/0177053 A1* | 9/2003 | Otto | G06Q 30/02 705/7.29 |
| 2004/0064351 A1* | 4/2004 | Mikurak | G06Q 10/087 705/22 |
| 2005/0209914 A1* | 9/2005 | Nguyen | G06Q 10/02 705/14.56 |
| 2005/0273384 A1* | 12/2005 | Fraser | G06Q 30/0241 705/14.41 |
| 2006/0129464 A1 | 6/2006 | Chen | |
| 2006/0195331 A1* | 8/2006 | Goldthwaite | G06Q 99/00 345/581 |
| 2006/0243798 A1 | 11/2006 | Kundu et al. | |
| 2007/0106561 A1* | 5/2007 | Lubow | B42D 25/25 382/118 |
| 2009/0037244 A1* | 2/2009 | Pemberton | G06Q 10/087 705/28 |
| 2010/0030661 A1* | 2/2010 | Friedland | G06Q 30/0601 705/26.1 |
| 2010/0158315 A1* | 6/2010 | Martin | G06F 16/58 382/103 |
| 2010/0169343 A1* | 7/2010 | Kenedy | G06F 16/9535 707/758 |
| 2010/0223663 A1* | 9/2010 | Morimoto | G06F 21/64 726/7 |
| 2011/0145258 A1* | 6/2011 | Kankainen | G06Q 10/10 707/746 |
| 2011/0258049 A1 | 10/2011 | Ramer et al. | |
| 2012/0173323 A1* | 7/2012 | Barlow | G06Q 30/0235 705/14.1 |
| 2012/0215640 A1 | 8/2012 | Ramer et al. | |
| 2012/0256729 A1* | 10/2012 | Kang | G06Q 10/00 340/10.1 |
| 2012/0278387 A1* | 11/2012 | Garcia | G06F 16/335 709/204 |
| 2013/0043302 A1* | 2/2013 | Powlen | G06Q 50/01 235/375 |
| 2013/0044944 A1 | 2/2013 | Wang et al. | |
| 2013/0048710 A1 | 2/2013 | Marsico et al. | |
| 2013/0290172 A1* | 10/2013 | Mashinsky | G06Q 20/384 705/39 |
| 2014/0046802 A1* | 2/2014 | Hosein | G06Q 30/06 705/26.61 |
| 2014/0224867 A1* | 8/2014 | Werner | H04W 4/80 235/375 |
| 2014/0250123 A1 | 9/2014 | Prahlad et al. | |
| 2014/0250128 A1* | 9/2014 | Akin | G06F 16/2465 707/740 |
| 2014/0358632 A1* | 12/2014 | Graff | G06Q 30/0224 705/7.29 |
| 2015/0120386 A1* | 4/2015 | Sherman | G06Q 30/0202 705/7.31 |
| 2015/0379839 A1* | 12/2015 | Cheung | G06Q 30/0201 340/572.1 |
| 2016/0019238 A1* | 1/2016 | Mazniker | G06F 16/9537 707/711 |
| 2016/0092481 A1* | 3/2016 | Marshall | G06F 16/248 707/741 |
| 2017/0011450 A1* | 1/2017 | Frager | G06Q 30/0255 |

OTHER PUBLICATIONS

Xiao, Y., et al., "Radio frequency identification: technologies, applications, and research issues", Wireless Communications and Mobile Computing 2007, Published online Jul. 24, 2006, pp. 457-472, 7.

List of IBM Patents or Patent Applications Treated as Related dated Aug. 18, 2020, 2 pages.

* cited by examiner

PRODUCT PREFERENCE AND TREND ANALYSIS FOR GATHERINGS OF INDIVIDUALS AT AN EVENT

TECHNICAL FIELD

The subject matter of this invention relates to product preferences and trends, and more particularly to a system and method of collecting and analyzing product preferences and trends at a physical gathering of individuals at an event and/or belonging to a community.

BACKGROUND

Currently, there exist numerous systems for allowing users to "check-in" their presence at an event, such as a activity/game event, community event, club, conference, etc. For instance, mobile check-in apps can be used: to allow athletes participating in a competition to compare performances against other participants; to allow patrons at a night club to meet other patrons with similar likes; and to allow attendees at a conference to network with colleagues, etc.

Unfortunately, beyond the pure social aspect of such connections, there are limited value added services current check-in apps can provide to the users or third parties. Because users attending an event can have very disparate backgrounds, demographics and interests, providing useful content, trends or advertising can only be generalized to the particular event. For example, a novice participating in a triathlon may be interested in what equipment the better athletes are using. Such information however is not readily available using current check-in apps.

SUMMARY

The present disclosure provides a system and method in which users attending an event, and items associated with each user, are registered on site at the time of the event. Such items may include products, clothing, equipment, services, etc., that are somehow associated with the event. The "event-user-item" information is stored and then analyzed for use by other users or data consumers.

A first aspect provides an event check-in system running on a computing system with a processor and memory, comprising: a system for setting up and managing an event; a system for registering users physically present at the event; a system for registering items associated with the users and storing event-user-item (EUI) information in an EUI database; and an analysis system for analyzing EUI information to provide item preferences and trend analysis.

A second aspect provides a computer program product stored on computer readable storage medium, which when executed by a computing system provides an event check-in system, comprising: program instructions for setting up and managing an event; program instructions for registering users physically present at the event; program instructions for registering items associated with the users and for storing event-user-item (EUI) information in an EUI database; and program instructions for analyzing EUI information to provide item preferences and trend analysis.

A third aspect provides a computerized method of providing an event check-in system, comprising: providing an interface for setting up and managing an event; registering users physically present at the event; registering items associated with the users and storing event-user-item (EUI) information in an EUI database; and analyzing EUI information to provide item preferences and trend analysis.

BRIEF DESCRIPTION OF THE DRAWINGS

These and other features of this invention will be more readily understood from the following detailed description of the various aspects of the invention taken in conjunction with the accompanying drawings in which.

Figure 1:
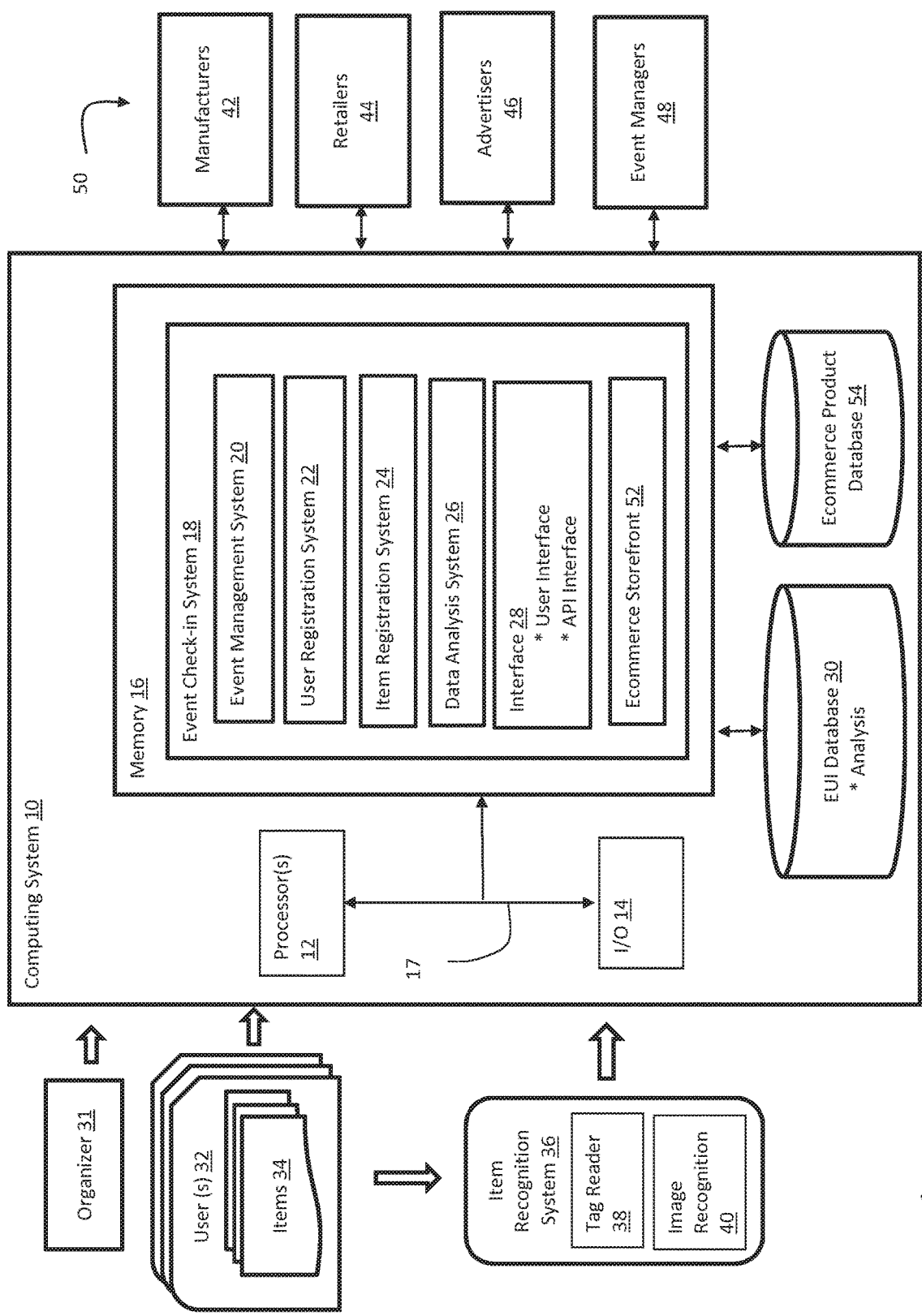
FIG. 1 shows computing system having an event check-in system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having an event check-in system 18 that provides a check-in service for users 32 gathered at (i.e. attending) an event. In addition to checking in their presence at a physical location associated with an event, users 32 are able to check-in items 34 being carried or used by the user 32 at the event. The check-in process may be done at a kiosk or via a mobile device that is located within a defined geospatial area. In the case of a mobile device, a downloadable app may be used to perform the various user activities described herein. Regardless, the resulting information is collected and analyzed to, e.g., provide product trends that enhance a user's ability to adapt to given community, help create like-minded communities, provide value added information to organizers or third parties involved with an event, allow for tailored marketing, etc.

Event check-in system 18 generally includes: an event management system 20 for setting up and managing a particular event; a user registration system 22 for registering users 32 attending the event; an item registration system 24 for registering items 34 (e.g., products, equipment, clothing, etc.) associated with each user 32; an "event-user-item" (EUI) database 30 for storing EUI information; a data analysis system 26 for analyzing EUI information; and an interface 28 for allowing users 32 and data consumers 50 to access EUI information and associated analysis.

Event management system 20 may for example include a mechanism for allowing an organizer 31 to set up a new event (e.g., a party, a conference, a activity/game event, etc.) and/or establish a community (e.g., a running club, a business organization, etc.) that has a membership of users 32 that hold regular events. Event management system 20 may also include a facility for managing, tracking and storing information associated with events. For example, a running club may track times and finishes for users 32 participating in a series of racing events.

As noted, user registration system 22 provides a mechanism for registering users 32 attending an event. Users may be registered in any manner, e.g., via a kiosk, a mobile app, etc. In addition to the identity of a user 32, information may also be collected or accessed for each user 32. Whenever a user 32 is registered on-site for an event, item registration system 24 is utilized to collect and register item information associated with the user 32. For example, a runner participating in a competition may register items such as sneakers, clothing, sunglasses, etc., a skier at a ski competition may register skis, boots, protective head cover, gloves, goggles, coat, pants, etc.

Items 34 are identified by an item recognition system 36, which may for example include a tag reader 38 (e.g., a bar code reader, near field device reader, QR code reader, etc.), an image recognition 40 that utilizes video/image analysis to identify items 34, a manual entry system, etc. Special tags that identify an item (e.g., model number, make, etc.) may for example be placed on items 34 by manufacturers, retailers, organizers, etc., who are interested in tracking item usage.

The event-user-item (EUI) information is then stored in EUI database 30 along with any analysis performed by data analysis system 26. Data analysis system 26 may for example utilize statistical analysis to identify trends, clustering to cluster products, user information, events, etc. For example, certain products may be shown as becoming more and more popular amongst athletes identified as experts. In another example, certain clothing styles may be identified as forming a first cluster for patrons of night clubs in one neighborhood, while another clothing style may form a second cluster for patrons of night clubs in another neighborhood. Accordingly, EUI information and analysis provides an enhanced level of information not previously available with existing check-in apps.

Interface 28 provides a mechanism for accessing EUI database 30 and analysis information, and may include a user interface that allows users 32 to query information using known search techniques, e.g., dropdown boxes, structured search queries, etc. More advanced searches are also contemplated to access information such as "what equipment are athletes at my level using?" or "what do people wear to night clubs in Rio'?" Such queries may be done, e.g., via a natural language (NL) interface. Interface 28 may also include application programming interfaces (APIs) that allow data consumers 50 to plug into event check-in system 18 to access data. Data consumers 50 may for instance include manufacturers 42, retailers 44, advertisers 46, and event managers 48. EUI database 30 may thus be accessed by data consumers 50 and utilized as a basis for advertising drives, targeted marketed, product designs, event planning, retail sales, etc.

Also included is an ecommerce storefront 52 that, e.g., allows organizations or other entities to manage and sell products targeted at events, organization members, market segments, or users 32 as a whole. Thus for example, if it is known that certain products are commonly used amongst members of an organization, at certain types of events, or for certain types of users, those products can be sold via the ecommerce storefront 52. An ecommerce product database 54 can be used to pull data from, and manage orders with, a manufacturer 42, retailer 44, or other ecommerce site. Thus, in the case where a mobile app is utilized by an end-user 32 to access the event check-in system 18, the ecommerce storefront 52 can be accessed via the app by the user 32 to order and purchase items.

Figure 2:
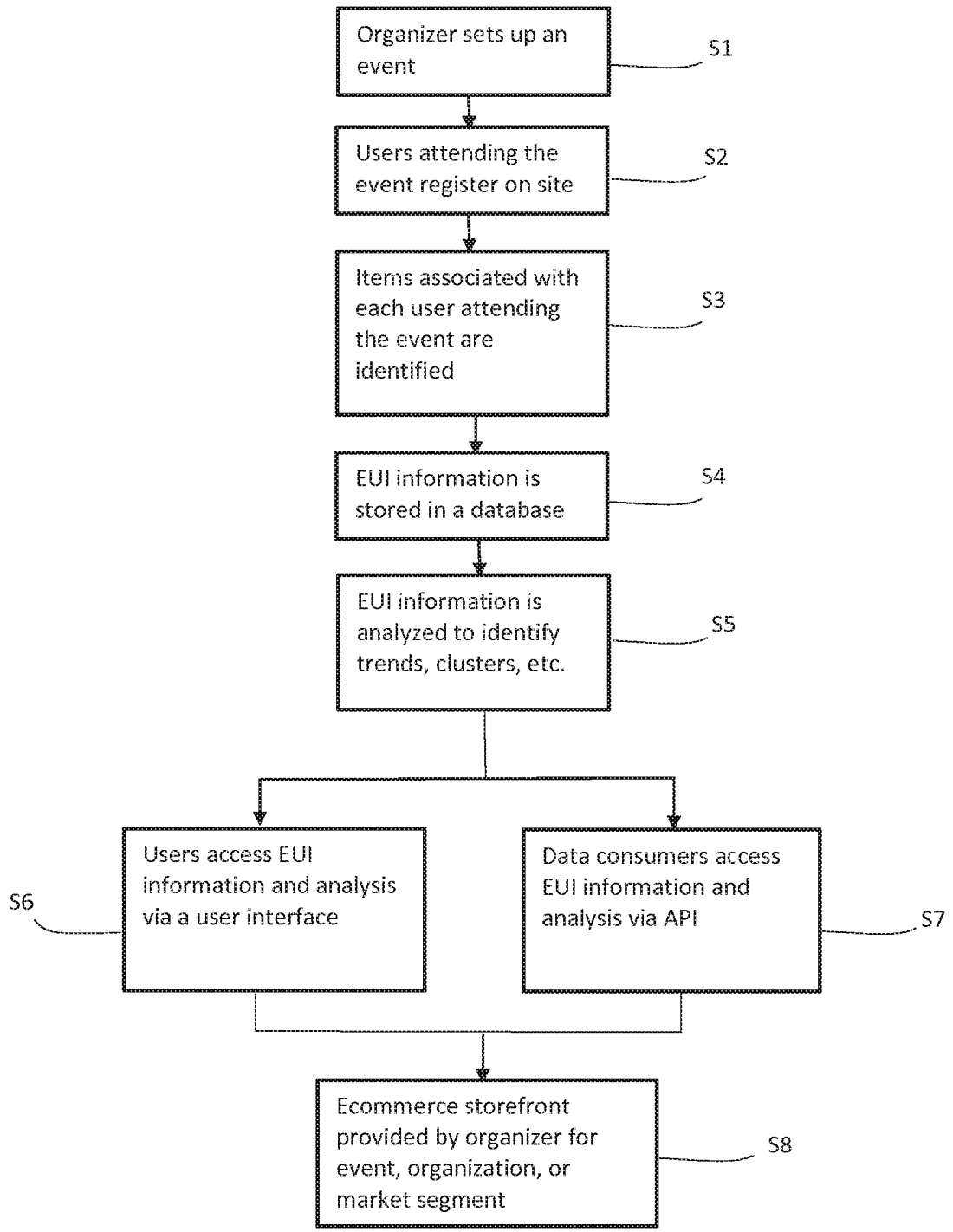
FIG. 2 shows a method flow of a check-in service according to embodiments.

FIG. 2 depicts a flow diagram of a method of providing a check-in service as described herein. At S1, an organizer 31 sets up an event at the event check-in system 18 and at S2, users 32 attending the event register on-site. Next, at S3, items 34 associated with each user 32 attending the event are identified (e.g., via a tag reader 38 or image recognition 40). Event-user-item (EUI) information is then stored in EUI database 30 at S4 and at S5, EUI information is analyzed to identify trends, clusters, etc. At S6, other users 32 are provided access to EUI information and analysis via a user interface and at S7, data consumers 50 can access EUI information and analysis via APIs. Finally, an ecommerce storefront 52 is provided by an organizer 31 (or some other entity) for the event, organization or market segment.

Figure 3:
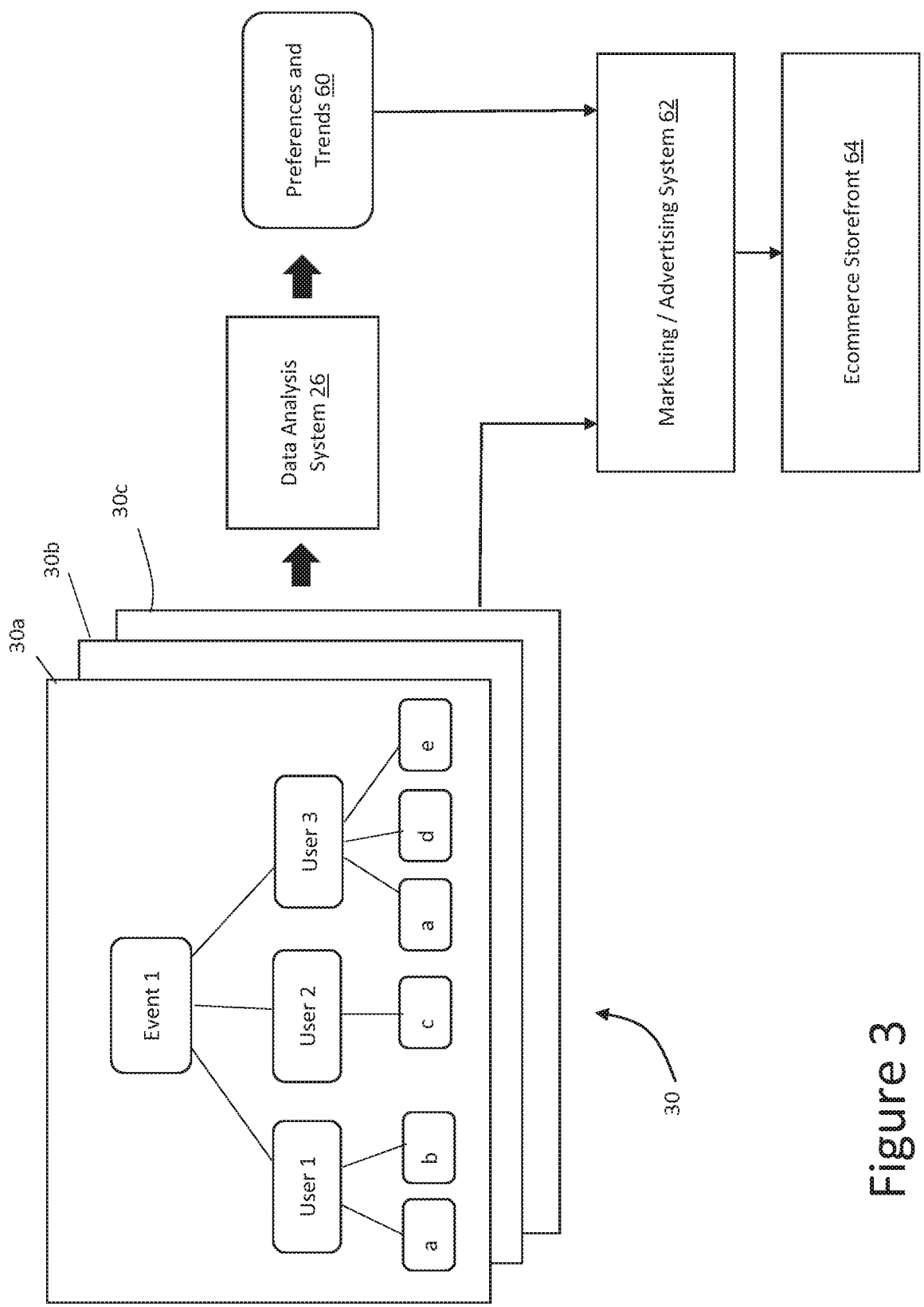
FIG. 3 shows a process diagram for utilizing captured data according to embodiments.

FIG. 3 depicts a process diagram for utilizing data captured by event check-in system 18. In this example, EUI database 30 contains information collected from a series of events 30a, 30b, 30c. Events 30a, 30b, 30c may comprise related or unrelated events. For example, related events may comprise a set of events over time put on by the same organization, e.g., a series of competitions by a running club. Alternatively, events 30a, 30b, 30c may comprises unrelated events staged by different organizers for different purposes. Related and unrelated events 30a, 30b, 30c may be grouped or organized into sets within EUI database 30 based on a category, subcategory, date, location, etc., e.g., activity/ game events, networking events, social events, etc.

In this example, data is arranged hierarchically based on the event, users participating in the event, and items (a, b, c . . . ) associated with the users. Robust metadata may also be incorporated into nodes within database 30, e.g., event information such as data/time/location/category, information for users such as likes and dislikes, performance information for users such as competition times, item information such as model, make and size, etc.

As noted, data analysis system 26 accesses and analyzes the data to identify preferences and trends 60. For instance, user 1 and user 3 both have item "a", potentially indicating a preference. Further analysis may reveal that item "a" is appearing at certain types of events, appearing in certain geographical regions, etc. A further chronological analysis of events 30a, 30b, 30c may show that item "a" is appearing with more and more users over time, thus indicating a trend.

In this case, preferences and trends are fed to a marketing/ advertising system 62 that can be used to identify products of interest for upcoming events, for groups of users, for geographic regions, etc. That information can be used by ecommerce storefront 64 to target sales and marketing efforts. In other cases, preferences and trends 60 can be made available to manufactures to help with product designs, to other users to see what products are trending, to event planners to help entice product representatives to attend, etc.

Event check-in system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts an illustrative computing system 10 that may comprise any type of computing device and, and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O can comprise one or more human I/O devices, which enable a user to interact with computing system 10.

Furthermore, it is understood that the event check-in system 18 or relevant components thereof (such as an API component, item recognition system, user Apps, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will, select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method for an event check-in, comprising:
   setting up and managing an event, by a processor;
   registering, by the processor, a user physically present at the event and obtaining an identity of the user and information for the user;
   automatically registering, by the processor, items associated with the user, wherein a tag is attached to each item associated with the user, the tag containing information regarding the item, wherein the information regarding the item is received from a tag reader automatically reading the tag attached to each item to associate each item with the user;
   storing, by the processor, event-user-item (EUI) information in an EUI database, the EUI information including the identity of the user, the information for the user, and the information regarding the items associated with the user; and
   analyzing, by the processor, the EUI information to provide item preferences and trend analysis, the trend analysis identifying trending of the items at different events and locations, wherein the trend analysis identifies at least a trend of a particular item at a particular physical event at a particular geographic region as registered and stored in the EUI database,
   wherein the automatically registering items further includes automatically identifying the items associated with the user by using automatic image recognition,
   the method further comprising providing an application programming interface for allowing data consumers to access the EUI database.

2. The computer-implemented method of claim 1, wherein the user is registered with a mobile app.

3. The computer-implemented method of claim 1, wherein the user is registered with a kiosk.

4. The computer-implemented method of claim 1, further comprising providing a user interface for querying information from the EUI database.

5. The method of claim 1, further comprising offering items to the user identified as relevant to the event.

6. A computer program product, the computer program product comprising:
   one or more non-transitory computer readable storage media, and program instructions collectively stored on the one or more computer readable storage media, the program instructions comprising:
   program instructions to set up and managing an event;
   program instructions to register a user physically present at the event, the program instructions to register obtaining an identity of the user and information for the user; and
   program instructions to automatically register items associated with the user, wherein a tag is attached to each item associated with the user, the tag containing information regarding the item, the program instructions to automatically register items including program instructions of a tag reader to automatically read the tag attached to each item to associate each item with the user;
   program instructions to store event-user-item (EUI) information in an EUI database, the EUI information including the identity of the user, the information for the user, and the information regarding the items associated with the user;
   program instructions to analyze the EUI information to provide item preferences and trend analysis, the trend analysis identifying trending of the items at different events and locations, wherein the trend analysis identifies at least a trend of a particular item at a particular physical event at a particular geographic region as registered and stored in the EUI database;
   wherein the program instructions to automatically register items further includes program instructions to automatically identify the items associated with the user by using automatic image recognition;
   program instructions to provide an application programming interface for allowing data consumers to access the EUI database.

7. The computer program product of claim 6, wherein the user is registered with a mobile app.

8. The computer program product of claim 6, wherein the user is registered with a kiosk.

9. The computer program product of claim 6, further comprising program instructions to provide a user interface for querying information from the EUI database.

10. The computer program product of claim 6, further comprising program instructions to offer items to the user identified as relevant to the event by the program instructions to analyze the EUI information stored in the EUI database.

* * * * *